UNITED STATES PATENT OFFICE.

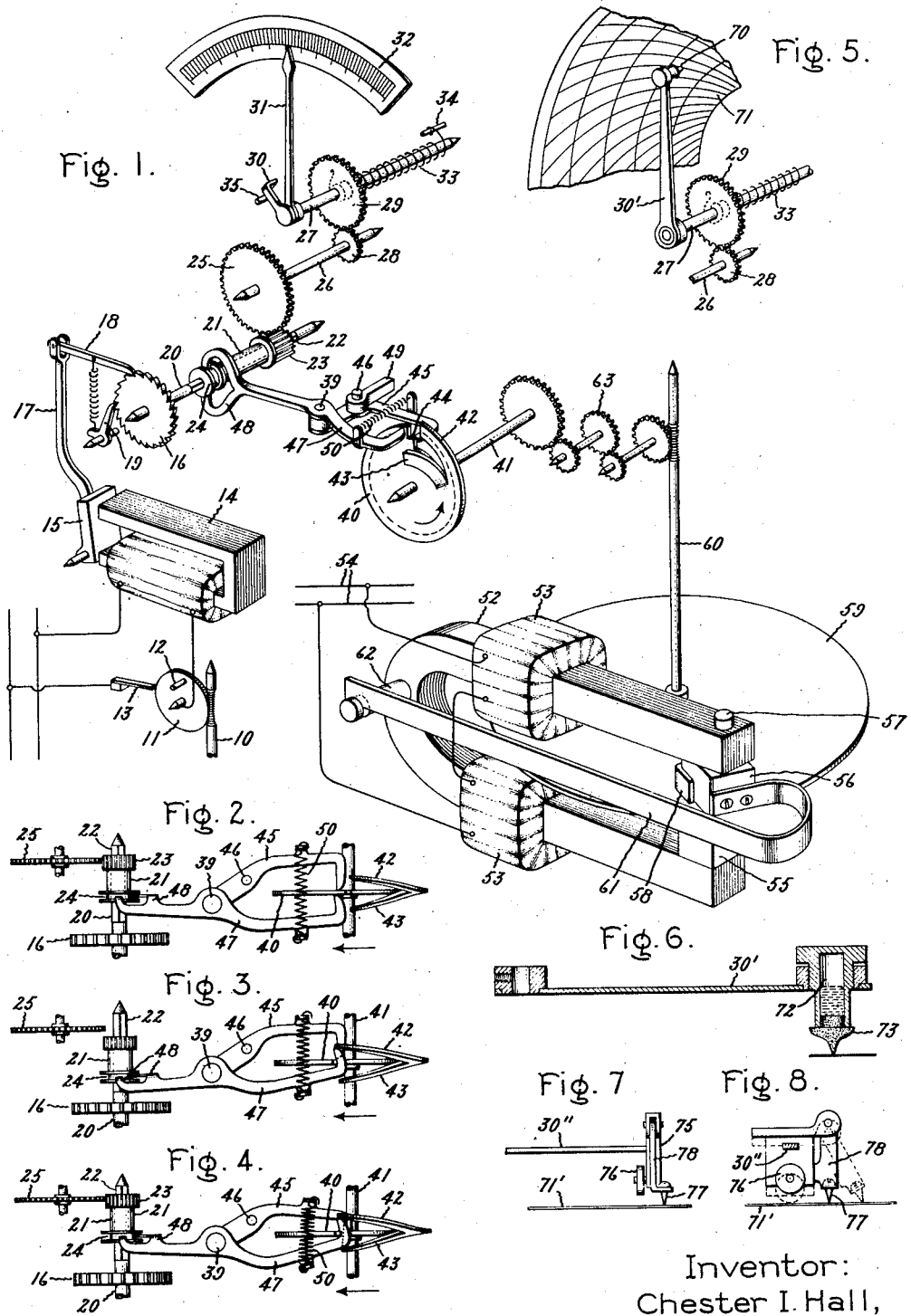

CHESTER I. HALL, OF FORT WAYNE, INDIANA, ASSIGNOR TO GENERAL ELECTRIC COMPANY, A CORPORATION OF NEW YORK.

DEMAND APPARATUS.

1,331,915.     Specification of Letters Patent.     Patented Feb. 24, 1920.

Application filed December 9, 1916. Serial No. 136,005.

*To all whom it may concern:*

Be it known that I, CHESTER I. HALL, a citizen of the United States, residing at Fort Wayne, county of Allen, State of Indiana, have invented certain new and useful Improvements in Demand Apparatus, of which the following is a specification.

My invention relates to demand apparatus and particularly to apparatus for indicating or recording the maximum demand made by an electrical installation upon its source of energy supply. The object of the invention is to provide an improved demand apparatus, and more particularly to provide an improved demand meter for electrical installations. A further object of the invention is to provide an improved mechanical device for periodically restoring the indicating element of a demand apparatus to its initial or zero position. Other objects of the invention will be brought out in the course of the following description.

A well known type of demand apparatus, as applied to an electrical installation, measures the demand of the installation upon its source of energy supply during each of a number of equal intervals of time. The demand during each of these time intervals may be graphically recorded, or a permanent record may be retained of only the maximum demand. My present invention particularly relates to a demand apparatus of this type. The indicating element of an apparatus of this type is driven in any suitable manner from the meter shaft, and at equal intervals of time the driving connection between the meter shaft and the indicating element is interrupted, whereupon the indicating element is returned in any suitable manner to its initial or zero position. In accordance with my present invention, I have provided an improved mechanical device consisting in its complete form of a duplex cam and a coöperating pair of trip levers for periodically interrupting the driving connection between the meter shaft and the indicating element. The construction and mode of operation of this improved resetting device together with the other novel features of my present demand apparatus will be better understood from the following description taken in conjunction with the accompanying drawings, in which:

Figure 1 is a diagrammatic view in perspective of a demand meter embodying my present invention; Figs. 2, 3, and 4 are detail explanatory views illustrating the operation of my improved mechanical resetting device; Fig. 5 illustrates a graphic recording or indicating means which may be used with the apparatus; Fig. 6 is a detail view of the inking stylus of the recorder shown in Fig. 5; and Figs. 6, 7, and 8 are detail views of a modified marking device suitable for use with the recorder of Fig. 5.

The upper part of the rotatable shaft 10 of an electric meter is shown in Fig. 1 for the purpose of representing any electric energy meter of the motor type. The worm at the upper end of the meter shaft 10 drives a worm gear 11 carrying a contact 12. A fixed spring contact 13 is positioned in the path of movement of the contact 12. The engagement of the contacts 12 and 13 energizes the coil of an electromagnet 14, whereupon the pivoted armature 15 of the electromagnet is drawn toward the poles of the magnet and a ratchet wheel 16 is turned through the pitch of one tooth by means of an arm 17 and a pivoted pawl 18. A spring-pressed pawl 19 prevents turning of the ratchet wheel 13 in a backward direction. Thus, each time the worm gear 11 makes one complete revolution the ratchet wheel 16 is turned through a definite angle. In this manner the rotation of the meter shaft 10 is transmitted to the ratchet wheel 16.

The ratchet wheel 16 is secured to a pivoted shaft 20. A sleeve 21 having a square hole is slidably mounted on a squared-portion 22 of the shaft 20. A pinion 23 is carried at one end of the sleeve 21 while a grooved-hub 24 is carried at the other end of the sleeve. The pinion, sleeve and grooved-hub may be integrally constructed, or these elements may be separately formed and secured together in any suitable manner. The sleeve together with its pinion and grooved-hub are thus arranged for reciprocatory movement along the squared-portion 22 of the shaft 20.

A gear 25 is secured to a pivoted shaft 26 and is arranged to mesh with the pinion 23. The shaft 26 is geared to another pivoted shaft 27 through a pinion 28 and a coöperating gear 29. An actuator 30 is secured to the shaft 27 and is arranged to move a non-return pointer 31 across a suitable scale 32. The pointer 31 is loosely mounted on the shaft 27 and is retained in the position to which it is moved by the actuator 30 by any suitable means, preferably frictional in character. A spring 33 surrounds a portion of the shaft 27 and is secured at one end to the gear 29 and at its other end to a fixed pin 34. The spring 33 is under a slight initial tension and tends to turn the shaft 27 in a backward, or counter-clockwise direction, as viewed in Fig. 1. The initial or zero position of the indicating element of the apparatus is determined by the engagement of the actuator 30 with a fixed stop or pin 35.

The sliding pinion 23 is thrown in and out of mesh with the gear 25 by a compound tripping lever. The compound lever is a combination of two simple levers and is operatively positioned between the grooved-hub 24 and a circular cam disk 40 secured to a pivoted shaft 41. On the periphery of the cam disk 40, extending for one-quarter of the circumference, and located in the same 90 degree sector of the cam, are two concentric shearings or inclined planes 42 and 43 projecting in opposite directions from the plane of the disk. The projections 42 and 43 are formed by two radial incisions, slightly displaced and offset from each other, and two circular incisions of different radii, and the two resulting cut-out portions of the disk are then forced equal distances in opposite directions from the plane of the disk, as clearly indicated in Figs. 1, 2, 3 and 4 of the drawings. The free end of the outer projection 42 slightly overlaps the free end of the inner projection 43, and a stepped-portion 44 is formed in the disk.

The compound tripping lever is a combination of two simple levers 45 and 47 of the first order, so connected mechanically that the resultant action is a motion that causes the sliding pinion 23 to move first in one direction and then in the other direction. The lever 45 is somewhat shorter than the lever 47 and has as its fulcrum the end of a bracket 49 which is secured to a fixed part of the apparatus. Thus, the shorter lever 45 is fulcrumed or pivoted about a relatively fixed pin 46 in the end of the bracket 49. The end of the weight arm of the lever 45 is the fulcrum of the lever 47 and is pivoted to it by means of a pin 39. The power arms of the two levers 45 and 47 extend in the same direction and are connected by a helical spring 50. The ends of the power arms of the levers 45 and 47 rest concentrically on opposite sides of the cam disk, the end of the long lever 47 resting nearest to the circumference of the disk, while the ends of both levers bear on the cam along the same radial line. Thus, one end of the lever 45 is positioned in the path of movement of the cam surface on the back of the disk 40, as viewed in Fig. 1, and this cam surface is a circle whose circumference includes the projection 43. Similarly, one end of the lever 47 is positioned in the path of movement of the other cam surface of the disk 40, which is the cam surface on the front of the disk as viewed in Fig. 1, and is indicated in dotted lines in this figure. The spring 50 is under a slight initial tension and is arranged to pull the cam-following ends of the levers 45 and 47 together, thereby maintaining these ends of the levers in contact with their respective cam surfaces, and otherwise assisting in the operation of the tripping device, as will be more fully explained hereinafter.

The long lever 47 is provided at its weight end with a yoke 48 which fits in the groove of the hub 24. When the cam-following end of the long lever 47 has reached a certain point on the cam it is pulled by the action of the spring 50 onto the end of the projection or inclined plane 42. This motion of the power arm of the long lever causes the weight arm to throw the sliding pinion 23 out of mesh with the gear 25. During this operation the lever 47 is fulcrumed about the pin 39. After a relatively short time, the cam-following end of the power arm of the short lever 45 is similarly pulled onto the end of the projection or inclined plane 43, and, acting as a lever of the first order, applies power to the long lever 47 in such a manner that the latter acts as a lever of the second order. The power applied by the short lever 45 to the long lever 47 is in such a direction that it causes the weight arm of the lever 47 to move in a direction opposite to that of its former motion, and the sliding pinion 23 is thrown again into mesh with the gear 25. It will be observed that the stepped-portion 44 of the cam disk permits the cam-following end of the lever 47 to drop off the plane surface of the cam a definite time interval before the cam-following end of the lever 45 drops off the plane surface of the cam.

The cam disk 40 is driven at substantially constant speed in any suitable manner. In the accompanying drawings, I have illustrated a substantially constant speed electric motor for this purpose. This motor comprises a U-shaped magnetic member 52 upon each leg of which is mounted an electric current carrying coil 53. The coils 53 are connected in series with each other and are adapted to be supplied with current from the conductors 54 of an alternating current circuit. The U-shaped magnetic member is provided at its ends with two poles 55 and 56 separated from each other by a small air gap of substantially uniform width. The pole 55 is rigidly secured to the magnetic member, while the pole 56 is secured to a pin 57 pivotally mounted in the U-shaped magnetic member. The pole 56 carries a shading coil 58 whose position may be adjusted by the rotation of the pole 56. A metallic disk armature 59 of conducting material is secured to a pivotally mounted shaft 60 and is positioned to rotate in the air gap between the poles 55 and 56 of the U-shaped magnetic member. A bi-metallic thermostat member 61 is connected at its crooked end to the pole 56 and is loosely positioned at its free end in a groove of a stud 62 secured to the U-shaped magnetic member. This constant speed electric motor forms no part of my present invention, since it is disclosed and claimed in my co-pending application for Letters Patent of the United States, Ser. No. 875,628, filed Dec. 5, 1914. The shaft 60 of the constant speed motor is connected through suitable speed reducing gearing 63 to the shaft 41.

The operation of the apparatus is as follows:—The cam disk 40 is driven at substantially constant speed in the direction of the arrows, Figs. 1, 2, 3 and 4, by the constant speed electric motor. Assuming the pinion 23 to be in mesh with the gear 25, rotation of the meter shaft 10 is transmitted to the actuator 30, and the actuator is, accordingly, moved in a clockwise direction, as viewed in Fig. 1. The trip levers 45 and 47 are in their neutral positions, and at the beginning of the time interval of demand measurement, these levers will occupy the relative positions shown in Fig. 4 of the drawings. As the cam disk 40 rotates the levers 45 and 47 will each be pushed outwardly by their respective cam surfaces, but since both are simultaneously pushed outwardly the same distance, there is no resultant movement of the yoke-end 48 of the lever 47, but the tension of the spring 50 is increased. The cam-following ends of the trip levers 45 and 47 thus ride along the projections 43 and 42, respectively, and then along opposite sides of the disk 40 until the end of the predetermined interval of demand measurement. At the end of the time interval, the cam-following end of the lever 47 is first pulled by the energized spring 50 off the outer notch of the stepped-portion 44 of the disk onto the projection 42. The sleeve 21 is thereupon moved with a quick snap action along the squared-portion 22 of the shaft 20, whereby the pinion 23 is withdrawn from engagement with the gear 25. The relative positions of the elements of the tripping device at this instant are shown in Fig. 3 of the drawings. Fig. 2 of the drawings shows the relative positions of the elements of the tripping device just before the expiration of the time interval, that is, just before the cam-following end of the lever 47 has been pulled onto the projection 42. A relatively short time later, the cam-following end of the lever 45 is pulled off the inner notch of the stepped-portion 44 of the disk 40 onto the projection 43, whereupon the yoke-end 48 of the lever 47 is moved so as to slide the pinion 23 again into mesh with the gear 25. The relative positions of the elements of the tripping device at this instant are shown in Fig. 4 of the drawings. The same cycle of operations is then repeated. It will thus be evident that each time the disk 40 makes one complete revolution, the pinion 23 is withdrawn from engagement with the gear 25 and a relatively short time later the pinion is again moved into mesh with the gear. When the pinion and gear are operatively disengaged the spring 33 returns the shaft 27 and the other elements operatively connected thereto to their initial or zero positions, determined by the engagement of the actuator 30 with the fixed stop 35. The non-return pointer 31 indicates the maximum movement of the actuator 30 during any one of a number of equal intervals of time, and hence the maximum demand of the electrical installation, as is well understood in the art.

Where a permanent record is desired of the demand during each predetermined equal time interval, a pointer 30' may be secured to the shaft 27, as illustrated in Fig. 5 of the drawings. The pointer 30' carries at its outer end an inking stylus 70. This stylus is adapted to draw a line on a circular time-actuated record chart 71, of well known design. The construction of the inking stylus 70 is shown in detail in Fig. 6 of the drawings. It will be seen that the inking stylus comprises an ink receptacle 72 which is suitably secured to the pointer 30'. The end of the ink receptacle 72 is closed by a stopper 73 of porous material, such for example as bamboo or cane cut with the grain of the wood. The end of the stopper 73 is pointed so as to draw a suitable line on the record chart. Oxidation of the ink is prevented in this form of inking stylus, and a small quantity of ink is allowed to feed at a slow rate through the porous material of the stopper 73.

In Figs. 7 and 8, I have illustrated a modified marking device for use in those cases where it is not desirable to use ink. This marking device comprises a carriage 75 secured to the end of a pointer 30" and having a roller 76. A suitable marking stylus 77 is carried at the free end of an arm 78 pivoted to the carriage 75. The purpose of this arrangement is to relieve the friction between the stylus and the record sheet 71', when the former moves in one direction. The relative positions of the carriage and stylus during the up-stroke or record-making movement of the pointer 30", that is when the pointer is moving toward the right as viewed in Fig. 8, are shown in this figure in full lines. When the pointer moves in this direction the stylus bears on the record sheet with sufficient pressure to impart a satisfactory mark. On the return-stroke of the pointer, that is when the pointer moves toward the left as viewed in Fig. 8 the carriage drops onto the roller 76 while the stylus trails loosely behind, as indicated in dotted lines in this figure. By the use of such a marking stylus the tension of the spring 33 can be relatively slight, because the friction between the stylus and the record sheet during the return-stroke of the pointer is practically negligible, and, consequently, a relatively small force is sufficient to return the recording device to its initial or zero position.

The resetting device of my present invention is entirely mechanical. Its construction is simple and its operation is reliable and there is little or no possibility of the device failing to operate. The spring between the two trip levers gives the device a snap-like action so that the disengagement of the pinion 23 and gear 25 and likewise the subsequent reëngagement of these gears are effected almost instantaneously. Thus, by my improved resetting device the slow uniform motion of the cam disk is converted into a practically instantaneous motion without the use of complicated external tripping and operating mechanisms. It will be observed that the two trip levers are near together at the beginning of each time interval of demand measurement, see Fig. 4. The cam then operates to separate the levers without moving the yoke-end 48 of the lever 47 and at the same time increases the tension of the spring 50 so as to obtain the desired snap-action when the levers are pulled onto their respective projections. The time interval of demand measurement may of course be of any desired duration, for example the cam disk 40 may complete one revolution each minute, or each fifteen minutes, or in any other desired period of time. The time interval between the operation of the disengaging lever 47 and the reëngaging lever 45 is relatively short with respect to the time interval of demand measurement, and in most instances a few seconds is sufficient time between these operations of the two levers. All that is required in this connection is to maintain the pinion 23 and gear 25 disengaged long enough to permit the indicating element to return to its initial position.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by any other means.

What I claim as new and desire to secure by Letters Patent of the United States, is:—

1. A demand apparatus comprising in combination a rotatable shaft, a second shaft arranged to be driven by said rotatable shaft, a pinion slidably mounted on said second shaft, a gear adapted to mesh with said pinion, an indicating element operatively connected to said gear, a rotatable cam, means for rotating said cam, and a following device operatively related to said cam and to said pinion and arranged to periodically impart a reciprocatory motion to said pinion whereby the operative engagement between said pinion and said gear is periodically interrupted.

2. A demand apparatus comprising in combination a rotatable electric meter shaft, a second shaft arranged to be driven by said meter shaft, a pinion slidably mounted on said second shaft, a gear adapted to mesh with said pinion, an indicating element operatively connected to said gear, a rotatable cam, means for rotating said cam at substantially constant speed, a following device operatively related to said cam and to said pinion and arranged to periodically impart a reciprocatory motion to said pinion whereby the operative engagement between said pinion and said gear is periodically interrupted and subsequently reëstablished, and means for returning said second shaft to its initial position each time the operative engagement between said pinion and said gear is interrupted.

3. A demand apparatus comprising in combination a rotatable shaft, an indicating element, means for transmitting the rotation of said shaft to said indicating element, a pair of trip levers pivoted to each other and to a fixed part of said apparatus and operatively related to said motion transmitting means between said shaft and said element, a cam having two cam surfaces one of which moves in engagement with one end of one of said levers while the other moves in engagement with one end of the other of said levers, and means for driving said cam, the cam surfaces of said cam being such that one of said levers periodically operates to interrupt said motion transmitting means between said shaft and said element while the other of said levers subsequently operates to reëstablish said motion transmitting means.

4. A demand apparatus comprising in combination a rotatable shaft, an indicating element, means for transmitting the rotation of said shaft to said indicating element, a circular disk having two circumferential and concentrically arranged portions projecting in opposite directions from the sides thereof, means for driving said disk, and a pair of trip levers pivoted to each other and to a fixed part of said apparatus and operatively related to said motion transmitting means between said shaft and said element, one end of one of said levers being arranged in the path of movement of one of said projecting portions of said disk while one end of the other of said levers is arranged in the path of movement of the other projecting portion of said disk, the projecting portions of said disk being of such configuration that one of said levers periodically operates to interrupt said motion transmitting means between said shaft and said element while the other of said levers subsequently operates to reëstablish said motion transmitting means.

5. A demand apparatus comprising in combination a rotatable shaft, an indicating element, means for transmitting the rotation of said shaft to said indicating element, a disk having a cam surface on each side thereof, means for rotating said disk, and a pair of trip levers pivoted to each other and to a fixed part of said apparatus and operatively related to said motion transmitting means between said shaft and said element, one of said levers being arranged in the path of movement of the cam surface on one side of said disk while the other lever is arranged in the path of movement of the cam surface on the other side of said disk, said disk and trip levers being so arranged as to periodically interrupt and subsequently to reëstablish the motion transmitting means between said shaft and said element.

6. A demand apparatus comprising in combination a rotatable electric meter shaft, a second shaft arranged to be driven by said meter shaft, a pinion slidably mounted on said second shaft, a gear adapted to mesh with said pinion, an indicating element operatively connected to said gear, a circular disk having a cam surface on each side thereof, a lever having one end thereof arranged in the path of the cam surface on one side of said disk and having its other end operatively engaging said pinion, a second lever having one end thereof arranged in the path of the cam surface on the other side of said disk and pivoted at its other end to said first mentioned lever, a spring secured to said levers and acting to maintain the cam-following ends of the levers in engagement with their respective cam surfaces, said second lever being pivoted intermediate its ends to a fixed part of said apparatus, the cam surfaces on said disk being such that said first lever periodically operates to move said pinion along said second shaft so as to disengage said pinion and said gear while said second lever subsequently operates to move said pinion along said second shaft so as to reëngage said pinion and said gear.

7. A demand apparatus comprising in combination a rotatable electric meter shaft, an indicating element, means for transmitting the rotation of said shaft to said element, a cam having two relatively fixed cam surfaces, means for driving said cam at substantially constant speed, and a pair of trip levers operatively related to the cam surfaces of said cam and adapted to periodically interrupt and subsequently to reëstablish the motion transmitting means between said shaft and said element.

8. A demand apparatus comprising in combination a rotatable electric meter shaft, an indicating element, means for transmitting the rotation of said shaft to said element, a cam having two cam surfaces, means for driving said cam at substantially constant speed, a pair of trip levers pivoted to each other and to a fixed part of said apparatus and operatively related to said motion transmitting means between said shaft and said element, one of said levers being arranged in the path of movement of one of the cam surfaces of said cam while the other lever is arranged in the path of movement of the other cam surface thereof, said cam and trip levers being so arranged as to periodically interrupt and subsequently to reestablish the motion transmitting means between said shaft and said element, and a spring secured to said levers and acting to maintain the cam-following parts of the lever in engagement with their respective cam surfaces.

9. A demand apparatus comprising in combination a rotatable electric meter shaft, a second shaft arranged to be driven by said meter shaft, a pinion slidably mounted on said second shaft, a gear adapted to mesh with said pinion, an indicating element operatively connected to said gear, a cam having two cam surfaces, means for driving said cam at substantially constant speed, a pair of trip levers operatively related to the cam surfaces of said cam and arranged to periodically interrupt and subsequently to reëstablish the operative engagement between said pinion and said gear, and means for returning said second shaft to its initial position each time the operative engagement between said pinion and said gear is interrupted.

In witness whereof I have hereunto set my hand this 6th day of December, 1916.

CHESTER I. HALL.